US009319682B2

(12) United States Patent
Togita

(10) Patent No.: US 9,319,682 B2
(45) Date of Patent: Apr. 19, 2016

(54) MOVING IMAGE ENCODING APPARATUS, CONTROL METHOD THEREFOR, AND NON-TRANSITORY COMPUTER READABLE STORAGE MEDIUM

(71) Applicant: CANON KABUSHIKI KAISHA, Tokyo (JP)

(72) Inventor: Koji Togita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 337 days.

(21) Appl. No.: 13/924,162

(22) Filed: Jun. 21, 2013

(65) Prior Publication Data

US 2014/0010304 A1 Jan. 9, 2014

(30) Foreign Application Priority Data

Jul. 6, 2012 (JP) .................. 2012-153022

(51) Int. Cl.
*H04N 19/00* (2014.01)
*H04N 19/172* (2014.01)
*H04N 19/152* (2014.01)
*H04N 19/115* (2014.01)
*H04N 19/593* (2014.01)

(52) U.S. Cl.
CPC ....... *H04N 19/00763* (2013.01); *H04N 19/115* (2014.11); *H04N 19/152* (2014.11); *H04N 19/172* (2014.11)

(58) Field of Classification Search
None
See application file for complete search history.

(56) References Cited

U.S. PATENT DOCUMENTS

| | | | | |
|---|---|---|---|---|
| 6,167,087 A * | 12/2000 | Kato | ........................ | 375/240.03 |
| 8,363,717 B2 * | 1/2013 | Togita et al. | ............. | 375/240.03 |
| 8,364,016 B2 * | 1/2013 | Mae et al. | ..................... | 386/248 |
| 8,385,727 B2 * | 2/2013 | Togita | ........................... | 386/337 |
| 2007/0286279 A1 * | 12/2007 | Hamanaka | ............... | 375/240.12 |
| 2008/0181300 A1 * | 7/2008 | Hosaka et al. | ........... | 375/240.03 |
| 2009/0135902 A1 * | 5/2009 | Nakagomi et al. | ....... | 375/240.02 |
| 2010/0135386 A1 * | 6/2010 | Shibata et al. | ............ | 375/240.03 |
| 2011/0019735 A1 * | 1/2011 | Koyabu | ..................... | 375/240.03 |
| 2011/0019930 A1 * | 1/2011 | Koyabu et al. | ................ | 382/238 |

FOREIGN PATENT DOCUMENTS

JP 2007-306257 A 11/2007

* cited by examiner

*Primary Examiner* — Jay Patel
*Assistant Examiner* — Reza Aghevli
(74) *Attorney, Agent, or Firm* — Fitzpatrick, Cella, Harper & Scinto

(57) ABSTRACT

A moving image encoding apparatus comprising a calculation unit configured to calculate an expected occupation amount of a virtual buffer when a picture contained in a generated encoded stream is held for decoding processing, and a code amount control unit configured to control a generated code amount in an encoding unit based on information of the occupation amount, wherein every time a predetermined group of pictures in the encoded stream starts, the calculation unit sets a virtual buffer having an initial value, and updates the occupation amount of the virtual buffer based on a size of the picture contained in the encoded stream, and the generated code amount is compared with a smallest occupation amount of the plurality of virtual buffer occupation amounts, and controls the generated code amount not to exceed the smallest occupation amount.

7 Claims, 4 Drawing Sheets

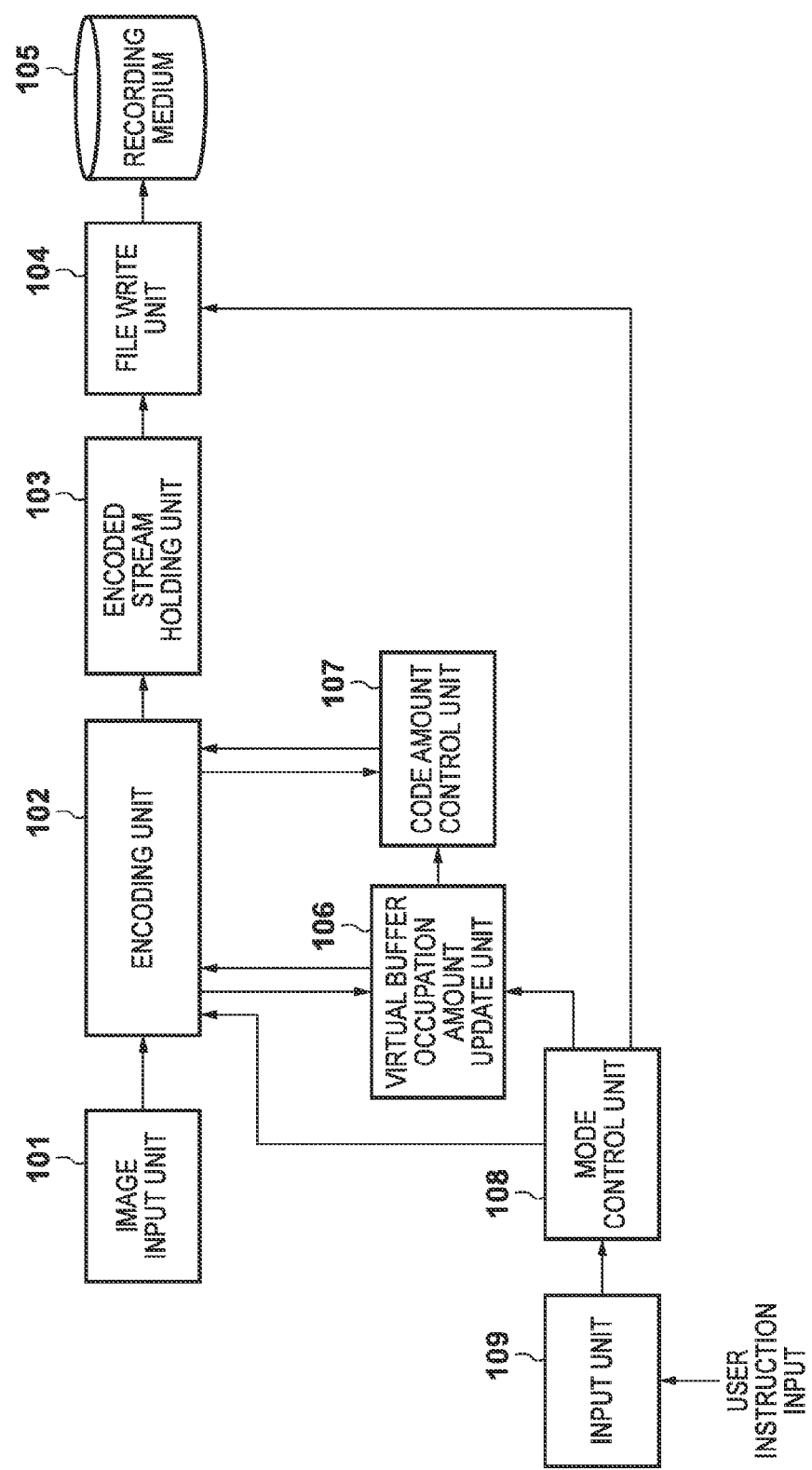

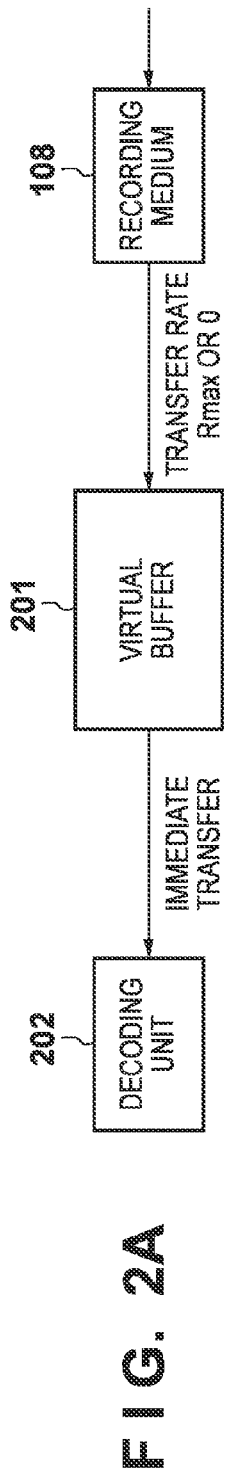
F I G. 2A
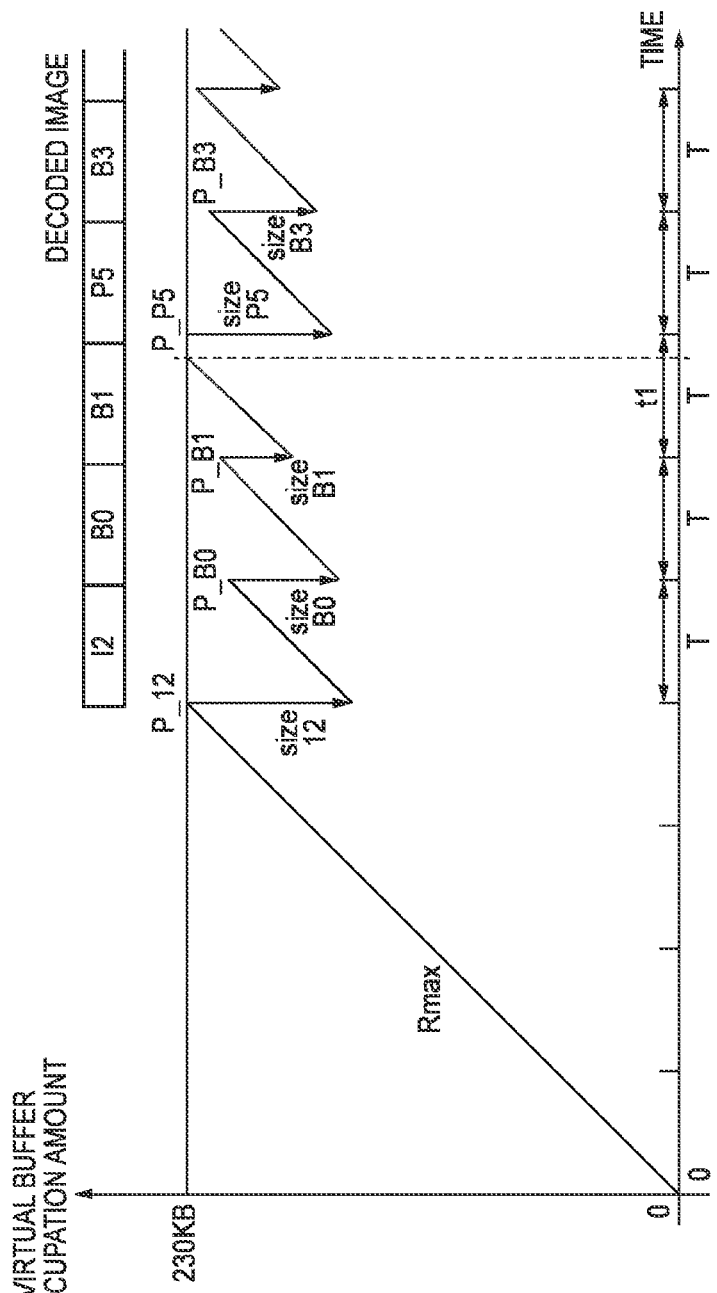
F I G. 2B

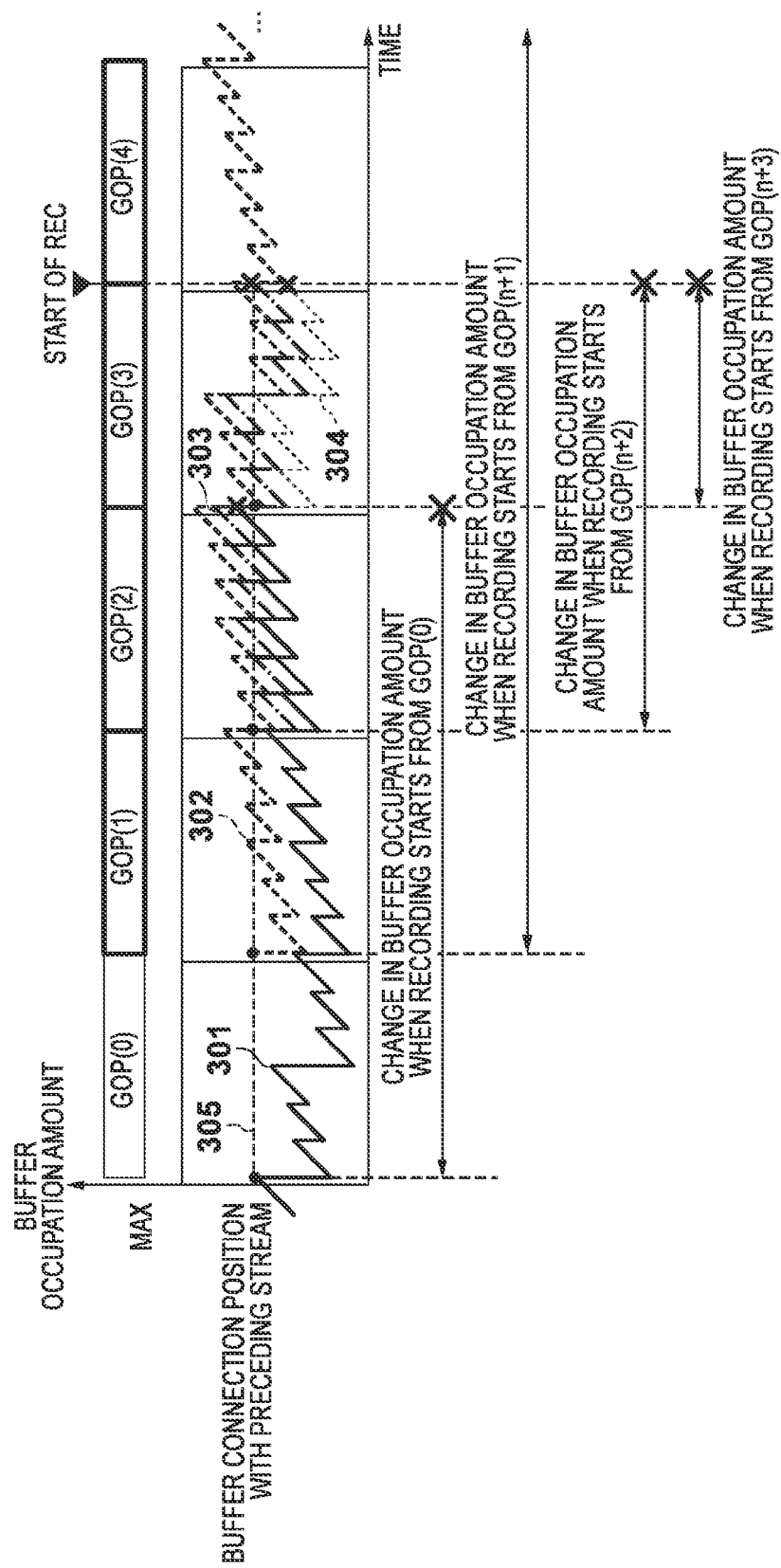

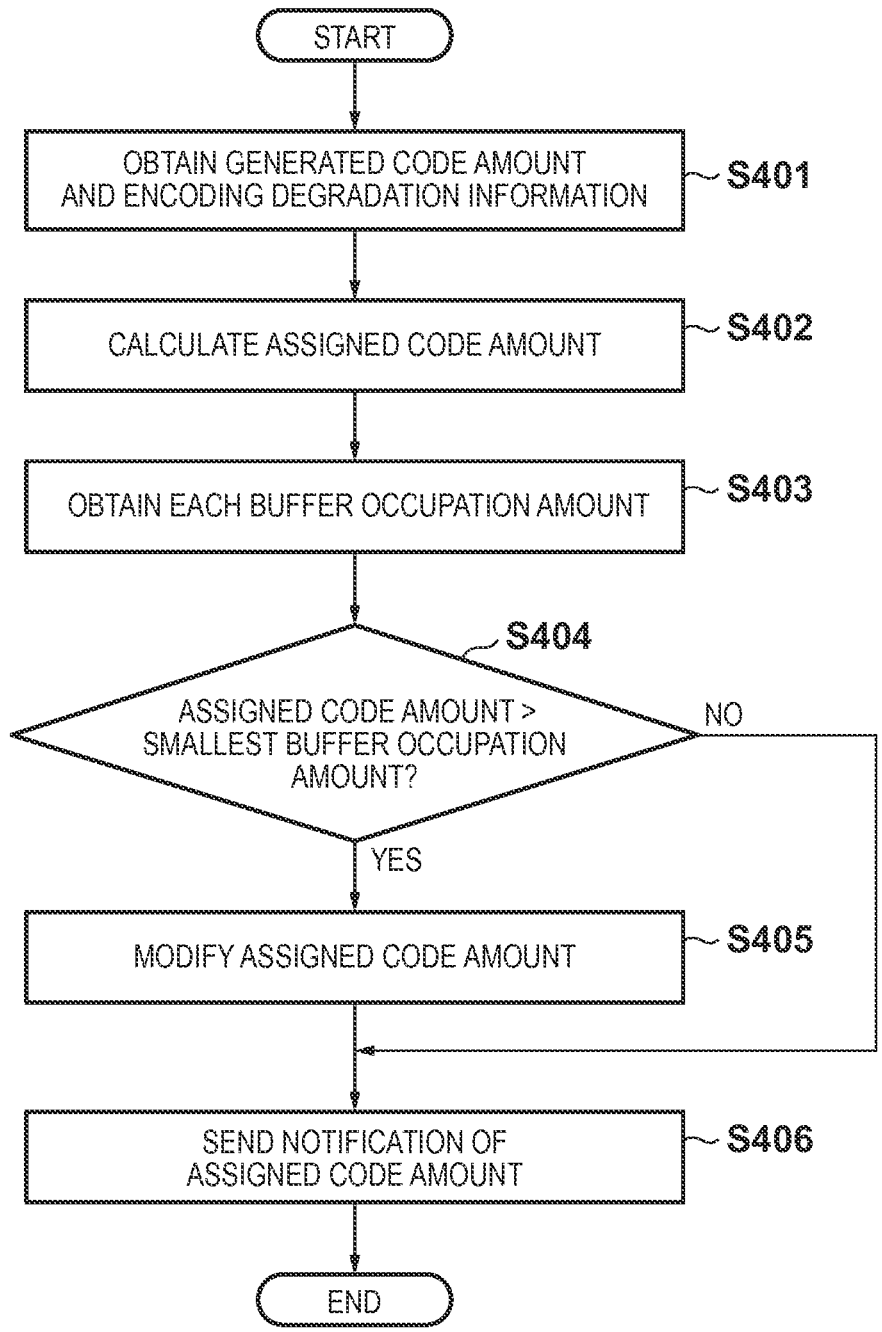

MOVING IMAGE ENCODING APPARATUS, CONTROL METHOD THEREFOR, AND NON-TRANSITORY COMPUTER READABLE STORAGE MEDIUM

BACKGROUND OF THE INVENTION

1. Field of the Invention

The present invention relates to a moving image encoding apparatus, a control method therefor, and a non-transitory computer readable storage medium.

2. Description of the Related Art

In recent years, video cameras for performing high definition recording in a storage medium using a disk medium, hard disk, or memory have become commercially available. Since these video cameras are readily portable and can record high-quality video, they are expected to become increasingly widespread. Such devices save video as a video stream (encoded stream) compression-encoded using, for example, MPEG-4 Part 10: AVC (ISO/IEC 14496-10, also known as H.264) in a recording operation, thereby achieving high definition recording. This compression encoding scheme adopts inter-frame prediction (inter prediction) using the correlation between images, and intra-frame prediction (intra prediction) using the correlation within a frame, while realizing high-efficiency compression encoding using arithmetic coding.

H.264 defines a virtual buffer to which an encoded stream is input at a given transfer rate and from which the encoded stream of each picture is extracted at a decoding time. It is possible to maintain the playback compatibility of generated encoded streams by controlling the code amount to prevent a failure of the virtual buffer.

When recording a plurality of scenes, seamless recording in which the virtual buffers of the encoded streams of the respective scenes are seamlessly connected is performed, thereby enabling a decoder to smoothly play back the streams of some of the scenes without stop. Furthermore, in order not to miss an unexpected opportunity to capture an image, video cameras having a pre-recording function of encoding and buffering a video input before the start of recording, and recording, upon start of recording, data for a predetermined past time as well have made their debut.

There has been proposed an encoding apparatus for recording, in management information, time information and a buffer occupation amount necessary for seamless recording as seamless information (see Japanese Patent Laid-Open No. 2007-306257).

SUMMARY OF THE INVENTION

The above proposed technique can seamlessly connect the last recorded encoded stream to a stream encoded without pre-recording. If, however, the last recorded encoded stream is connected to a pre-recorded encoded stream, a video input before the start of recording is encoded in pre-recording, and thus the occupation amount of a virtual buffer changes. The virtual buffer occupation amount upon start of recording is different depending on the timing of a recording start instruction.

It may therefore be impossible to seamlessly connect the virtual buffer occupation amount at the end of the recorded encoded stream and that at the beginning of a file recorded after a recording start instruction is issued, thereby causing underflow of the virtual buffer. When this happens, seamless recording and pre-recording cannot be simultaneously realized.

The present invention provides a technique of simultaneously realizing seamless recording and pre-recording by appropriately controlling the code amount so that no underflow of a virtual buffer occurs although a recorded encoded stream is connected to the virtual buffer at any timing.

One aspect of embodiments of the invention relates to a moving image encoding apparatus including an encoding unit configured to encode an image and generate an encoded stream, a holding unit configured to hold the generated encoded stream, and a write unit configured to write, in response to a recording start instruction, the encoded stream held by the holding unit in a recording medium, the apparatus comprising, a calculation unit configured to calculate an expected occupation amount of a virtual buffer when a picture contained in the generated encoded stream is held for decoding processing, and a code amount control unit configured to control a generated code amount in the encoding unit based on information of the occupation amount, wherein every time a predetermined group of pictures in the encoded stream starts, the calculation unit sets a virtual buffer having an initial value equal to a virtual buffer occupation amount at an end of the encoded stream written in the recording medium by the write unit, and updates the occupation amount of the virtual buffer based on a size of the picture contained in the encoded stream, and the code amount control unit compares the generated code amount with a smallest occupation amount of the plurality of virtual buffer occupation amounts calculated by the calculation unit, and controls the generated code amount not to exceed the smallest occupation amount.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing the arrangement of a moving image encoding apparatus according to an embodiment of the present invention;

FIG. 2A is a block diagram showing the arrangement of a virtual buffer model when viewed from the decoding side according to the embodiment of the present invention;

FIG. 2B is a timing chart showing a change in virtual buffer occupation amount when viewed from the decoding side according to the embodiment of the present invention;

FIG. 3 is a timing chart showing changes in virtual buffer occupation amount according to the embodiment of the present invention; and FIG. 4 is a flowchart illustrating control of an encoding unit according to the embodiment of the present invention.

DESCRIPTION OF THE EMBODIMENTS

Embodiments of the present invention will be described below with reference to the accompanying drawings.

FIG. 1 is a block diagram showing an example of the arrangement of a moving image encoding apparatus according to an embodiment of the present invention. The moving image encoding apparatus performs encoding to seamlessly connect an immediately preceding recorded encoded stream to a stream newly recorded by pre-recording. In the moving image encoding apparatus shown in FIG. 1, each block may be implemented by hardware using a dedicated logic circuit or memory. Alternatively, each block may be implemented by software by executing a processing program stored in a memory by a computer such as a CPU.

Encoding processing by the moving image encoding apparatus will be described with reference to FIG. 1. An image input unit 101 receives an image signal from an image sensor, and outputs it to an encoding unit 102. When a mode control unit 108 issues an encoding start instruction while stopping recording in a recording medium (a period during which encoding is performed while stopping recording in the recording medium will be referred to as a pre-recording period hereinafter) or issues a recording start instruction, the encoding unit 102 detects, for each predetermined pixel block, a motion in an input image based on preceding and succeeding frames accumulated in advance. The encoding unit 102 executes motion compensation based on a motion vector obtained as a result of motion detection between the frames. The predetermined pixel block is an encoded block (macroblock) including, for example, 16×16 pixels. By using the input image for intra-frame encoding, or using a difference signal between the original image and the data having undergone motion compensation for inter-frame encoding, the encoding unit 102 performs orthogonal transformation and quantization, and also performs entropy encoding, thereby generating an encoded stream, and outputting it to an encoded stream holding unit 103. Note that prediction encoding processing according to, for example, H.264 is well known and a detailed description thereof will be omitted in this specification. The encoding unit 102 outputs, as an encoding result, a generated code amount and encoding degradation information such as a PSNR (Peak Signal to Noise Ratio) to an encoding control unit 107.

The encoded stream holding unit 103 holds a given amount of encoded streams. In response to a recording start instruction from the user, a file write unit 104 starts writing, at the beginning of a file in a recording medium 105, the encoded stream which has been encoded from a time a predetermined period before the current time within a pre-recording period and held in the encoded stream holding unit 103. The file write unit 104 executes processing of writing encoded streams generated by the encoding unit 102 in the recording medium 105 until the user issues a recording stop instruction. A virtual buffer occupation amount update unit 106 updates the occupation amount of a virtual buffer based on the generated code amount and encoding degradation information of the encoding unit 102, and notifies the encoding control unit 107 of it. The virtual buffer is assumed when pictures contained in the generated encoded stream are held for decoding processing. The PSNR as encoding degradation information is calculated based on the input image and a local decoded image obtained by executing decoding processing for the encoded input image. The PSNR is an index indicating the degree of degradation of an image due to encoding, and is expressed in dB (decibels). The PSNR is calculated using the sum of squares of the difference between the input image and the local decoded image. As the PSNR value which is a calculation result is larger, the encoding degradation is smaller. On the other hand, as the PSNR value is smaller, the encoding degradation is larger.

During a pre-recording period, the occupation amount of a virtual buffer which is seamlessly connected to the end of the immediately preceding recorded stream is held and updated at the start of each group of pictures (GOP) as an encoding unit. A virtual buffer occupation amount for which a predetermined period has elapsed after the start of update of the virtual buffer is discarded. When the user issues a recording start instruction, virtual buffer occupation amounts other than that corresponding to an encoded stream to be recorded are discarded. The remaining virtual buffer occupation amount is then updated. A method of updating the virtual buffer occupation amount will be described in detail later.

The encoding control unit 107 notifies the encoding unit of the target value of the generated code amount (to be referred to as an assigned code amount hereinafter) and that of a quantization width as encoding indices of the encoding unit 102. In response to a user instruction, the mode control unit 108 notifies the encoding unit 102, virtual buffer occupation amount update unit 106, and file write unit 104 of start and stop of recording and start and stop of encoding. An input unit 109 serves as an operation unit for accepting an instruction input from the user. For example, the input unit 109 can accept a recording start instruction and recording stop instruction.

FIG. 2A is a block diagram showing the arrangement of a virtual buffer model when viewed from the decoding side. FIG. 2B is a timing chart showing a change in virtual buffer occupation amount when viewed from the decoding side. A method of updating the virtual buffer occupation amount by the virtual buffer occupation amount update unit 106 will be described with reference to FIGS. 2A and 2B.

Referring to FIG. 2A, a virtual buffer 201 receives an encoded stream from the recording medium 105 at a transfer rate Rmax in decoding. The size of the virtual buffer is defined by a pertinent standard. For example, H.264 defines, as a maximum size of the virtual buffer, a size corresponding to data transferred for one sec at the transfer rate Rmax. A decoding unit 202 extracts data of one picture from the virtual buffer 201 at each decoding time, and executes decoding processing.

A method of calculating the virtual buffer occupation amount will be described with reference to FIG. 2B. The ordinate represents the virtual buffer occupation amount, and the abscissa represents time. The virtual buffer 201 receives an encoded stream from the recording medium 105 at the transfer rate Rmax. At the decoding time of a picture I2, data of the encoded stream of the picture I2 is transferred to the decoding unit 202. With this operation, the virtual buffer occupation amount decreases from an amount P_I2 by a code amount size I2 at the decoding time. The encoded stream is continuously input from the recording medium 105 at the transfer rate Rmax until the time of decoding of a picture B0. Note that a time T indicates the display cycle of a picture, and is the reciprocal of a frame rate.

When the total amount of the transferred encoded streams reaches the capacity (230 KB) of the virtual buffer 201 at a time t1, input from the recording medium is stopped. When data of the encoded stream of a picture P5 is transferred to the decoding unit 202 at the decoding time of the picture P5, data transfer from the recording medium 105 to the virtual buffer resumes. A change in virtual buffer occupation amount updated by the virtual buffer occupation amount update unit 106 from when pre-recording starts until a time immediately after recording starts will be described with reference to FIG. 3. Referring to FIG. 3, 1 GOP=6 pictures. In pre-recording, 3 GOPs immediately before recording starts are set at the beginning of a file, and a period from when update of the virtual buffer starts until data is discarded is set to 3 GOPs. Note that the period from when update starts until data is discarded is not limited to 3 GOPs, and may be a predetermined number of GOPs.

A solid line 301 indicates a change in virtual buffer occupation amount when update starts in the 0th GOP. A dotted line 302 indicates a change in virtual buffer occupation amount when update starts in the first GOP. A one-dot dashed line 303 indicates a change in virtual buffer occupation amount when update starts in the second GOP. A dotted line 304 indicates a change in virtual buffer occupation amount when update starts in the third GOP. A dotted line 305 indicates the virtual buffer occupation amount at the end of the immediately preceding recorded stream.

According to this embodiment, during the pre-recording period, a plurality of virtual buffers are held each starting with one GOP, and each virtual buffer is updated based on the size of pictures included in the corresponding GOP, and discarded when a period of 3 GOPs elapses after the start of update. As shown in FIG. 3, a new virtual buffer is set every time a GOP starts. The buffer occupation amount (initial value) upon start of update of each virtual buffer is equal to the virtual buffer occupation amount at the end of the immediately preceding recorded stream. The code amount control unit controls to prevent underflow of each virtual buffer during the pre-recording period.

More specifically, in the 0th GOP of a pre-recording period, only the virtual buffer 301 is held and updated. In the succeeding, first GOP of the pre-recording period, the virtual buffers 301 and 302 are held and updated. Furthermore, in the second GOP of the pre-recording period, the virtual buffers 301, 302, and 303 are held and updated. In the third GOP of the pre-recording period, the virtual buffer 301 is discarded because it has stored 3 GOPs, and the virtual buffers 302, 303, and 304 are held and updated. In the fourth GOP of the pre-recording period, the mode control unit 108 issues a recording start instruction.

Therefore, the virtual buffers 303 and 304 are discarded. Only the virtual buffer 302 which has stored 3 GOPs upon start of recording, and corresponds to the encoded stream to be actually recorded is held and updated. Note that since the virtual buffer 302 updates the buffer occupation amount based on the virtual buffer occupation amount 305 at the end of the immediately preceding recorded stream, the virtual buffer of a stream newly recorded by pre-recording can seamlessly connect to that of the immediately preceding recorded encoded stream.

FIG. 4 is a flowchart illustrating control of the encoding control unit 107. Encoding control of the encoding unit 102 using the generated code amount sent by the encoding unit 102 and the virtual buffer occupation amount sent by the virtual buffer occupation amount update unit 106 will be described with reference to FIG. 4. This processing is executed for each picture when encoding pictures.

In step S401, the unit 107 obtains the generated code amount and encoding degradation information from the encoding unit 102. In step S402, by using the generated code amount and encoding degradation information obtained from the encoding unit 102, the unit 107 controls an assigned code amount so that the degree of encoding degradation is constant. An assigned code amount to be used to encode the next input image is decreased if the degree of degradation is low, or increased to suppress degradation if the degree of degradation is high. That is, the PSNR of the encoding degradation information is compared with a predetermined threshold. If the value of the PSNR is equal to or smaller than the threshold, the assigned code amount is increased; otherwise, the assigned code amount is decreased. This controls to make the value of the PSNR come close the threshold.

In step S403, the virtual buffer occupation amount update unit 106 obtains a plurality of virtual buffer occupation amounts held during the pre-recording period. In step S404, a smallest one of the obtained virtual buffer occupation amounts is compared with the assigned code amount calculated in step S403. If the assigned code amount is larger than the virtual buffer occupation amount (YES in step S404), the process advances to step S405. On the other hand, if the assigned code amount is equal to or smaller than the virtual buffer occupation amount (NO in step S404), the process advances to step S406.

In step S405, the assigned code amount is changed not to exceed the smallest one of the obtained virtual buffer occupation amounts. With this operation, the generated code amount of the encoding unit 102 is never larger than the smallest occupation amount at any timing. Therefore, no underflow of the buffer occurs when reading out a picture from the buffer in decoding. In step S406, the encoding unit 102 is notified of the assigned code amount.

As described above, regardless of the timing the user issues a recording start instruction during the pre-recording period, it is possible to perform encoding so that no underflow of a virtual buffer occurs even when connecting the immediately preceding recorded encoded stream to a stream newly recorded by pre-recording. It is, therefore, possible to provide a user-friendly moving image encoding apparatus in which when playing back some of encoded streams recorded by pre-recording of several scenes, the decoder can seamlessly play back the streams.

Other Embodiments

The present invention is implemented by executing the following processing. That is, the present invention is implemented by supplying software (a program) which implements the functions of the aforementioned embodiment to a system or apparatus via a network or various storage media, and reading out and executing the program by the computer (or CPU or MPU) of the system or apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153022, filed on Jul. 6, 2012 which is hereby incorporated by reference herein in its entirety.

What is claimed is:

1. A moving image encoding apparatus comprising
an encoding unit configured to encode moving image data in unit of a group of pictures including a predetermined number of frames and generate an encoded stream;
a holding unit configured to hold the encoded stream generated by the encoding unit,
a write unit configured to write, in response to a recording start instruction, the encoded stream held by the holding unit in a recording medium and to combine the written encoded stream with an encoded stream which has already been written in the recording medium,
wherein the holding unit holds, while the writing unit stops writing the encoded stream in the recording medium, the encoded stream of a predetermined number of the groups of pictures corresponding to a predetermined period, and the write unit starts recording, in response to the recording start instruction, the encoded stream from the group of pictures the predetermined numbers before the recording start instruction;

a calculation unit configured to calculate an expected occupation amount of a virtual buffer when a picture contained in the encoded stream generated by the encoding unit is held for decoding processing; and a code amount control unit configured to control a generated code amount in said encoding unit based on information of the occupation amount, wherein said calculation unit sets a plurality of virtual buffers, each of which starts from each of the predetermined number of groups of pictures held in the holding unit and has an initial value equal to a virtual buffer occupation amount at an end of the encoded stream which has been written in the recording medium, and updates the occupation amount of the virtual buffer corresponding to each of the predetermined number of the groups of pictures based on a size of the picture contained in the encoded stream, and wherein the code amount control unit compares the generated code amount with a smallest occupation amount among the plurality of occupation amounts, which is calculated by the calculation unit, corresponding to the same picture in each of the plurality of virtual buffers starting from each of the predetermined number of the groups of pictures, and controls the generated code amount not to exceed the smallest occupation amount.

2. The apparatus according to claim 1, wherein said calculation unit discards the virtual buffer starting from the group of pictures which has held in the holding unit for a predetermined period.

3. The apparatus according to claim 1, wherein the predetermined period includes a pre-recording period before the recording start instruction is accepted.

4. A control method for a moving image encoding apparatus including an encoding unit configured to encode moving image data in unit of a group of pictures including a predetermined number of frames and generate an encoded stream, a holding unit configured to hold the encoded stream generated by the encoding unit, and a write unit configured to write, in response to a recording start instruction, the encoded stream held by the holding unit in a recording medium and to combine the written encoded stream with an encoded stream which has already been written in the recording medium, the method comprising:

causing the holding unit to hold, while the writing unit stops writing the encoded stream in the recording medium, the encoded stream of a predetermined number of the groups of pictures corresponding to a predetermined period;

causing the write unit to start recording, in response to the recording start instruction, the encoded stream from the group of pictures the predetermined numbers before the recording start instruction;

causing a calculation unit to calculate an expected occupation amount of a virtual buffer when a picture contained in the encoded stream generated by the encoding unit is held for decoding processing; and causing a code amount control unit to control a generated code amount in the encoding unit based on information of the occupation amount, wherein in the calculation, a plurality of virtual buffers are set, each of which starts from each of the predetermined number of groups of pictures held in the holding unit and has an initial value equal to a virtual buffer occupation amount at an end of the encoded stream which has been written in the recording medium, and the occupation amount of the virtual buffer corresponding to each of the predetermined number of the groups of pictures is updated based on a size of the picture contained in the encoded stream, and in the controlling the generated code amount, the generated code amount is compared with a smallest occupation amount among the plurality of occupation amounts, which is calculated in the calculation, corresponding to the same picture in each of the plurality of virtual buffers starting from each of the predetermined number of the groups of pictures, and the generated code amount is controlled not to exceed the smallest occupation amount.

5. The apparatus according to claim 1, wherein the calculation unit discards, in response to the recording start instruction, the virtual buffer other than the virtual buffer starting from the group of pictures the predetermined numbers before the recording start instruction.

6. The apparatus according to claim 1, further comprising: an imaging unit, wherein the encoding unit encodes moving image data from the imaging unit.

7. The apparatus according to claim 1, wherein the write unit writes the encoded stream held in the holding unit in the recording medium in accordance with the recording start instruction received in a case where the encoded stream of a predetermined number of the groups of pictures has held in the holding unit.

* * * * *